(12) United States Patent
Kelkar (10) Patent No.: US 7,339,979 B1
(45) Date of Patent: Mar. 4, 2008

(54) ADAPTIVE BEAMFORMING METHODS AND SYSTEMS THAT ENHANCE PERFORMANCE AND REDUCE COMPUTATIONS

(75) Inventor: Kris Kelkar, Camarillo, CA (US)

(73) Assignee: Calamp Corp., Oxnard, CA (US)

( * ) Notice: Subject to any disclaimer, the term of this patent is extended or adjusted under 35 U.S.C. 154(b) by 752 days.

(21) Appl. No.: 10/764,040

(22) Filed: Jan. 23, 2004

Related U.S. Application Data

(60) Provisional application No. 60/446,947, filed on Feb. 11, 2003.

(51) Int. Cl.
*H04L 27/30* (2006.01)
(52) U.S. Cl. ............... 375/147; 375/267; 375/347; 375/349; 455/133; 455/137; 455/277.1
(58) Field of Classification Search ............... 375/141, 375/147, 216, 222, 260, 267, 347, 349; 455/17, 455/18, 22, 25, 45, 63.4, 65, 132, 133, 137, 455/272, 273, 277.1, 506; 370/294, 295, 370/321, 330, 337, 345, 480
See application file for complete search history.

(56) References Cited

U.S. PATENT DOCUMENTS

| 6,134,261 | A | 10/2000 | Ryan ..................... 375/141 |
| 6,441,786 | B1 | 8/2002 | Jasper et al. .............. 341/383 |
| 6,466,166 | B2 * | 10/2002 | Nakagawa ................ 342/378 |
| 6,597,678 | B1 * | 7/2003 | Kuwahara et al. ......... 370/342 |
| 7,106,785 | B2 * | 9/2006 | Yoshida ................... 375/148 |

2004/0204109 A1* 10/2004 Hoppenstein

OTHER PUBLICATIONS

L.C. Godara, "Applications of Antenna Arrays to Mobile Communications, Part II, 1997 Beam-Forming and Direction-of-Arrival Considerations", Proceedings of IEEE, vol. 85, pp. 1195-1234, Aug. 1997.
de Beek, et al., "On Channel Estimation in OFDM Systems", Purdue University, School of Electrical Engineering, undated paper, pp. 1-5.
Cheng, Zhenlan, et al., "Time vs Frequency Domain Channel Estimation for OFDM Systems with Antenna Arrays", Communication Technology Laboratory, 1988 Swiss Federal Institute of Technology, pp. 1-4.
Winters, Jack H., "Smart Antennas for Wireless Systems", IEEE Personal Communications, Feb. 1988, pp. 23-27.
Haynes, Toby, "A Primer on Digital Beamforming", Spectrum Signal Processing, Mar. 26, 1998.

* cited by examiner

*Primary Examiner*—Dac V. Ha
(74) *Attorney, Agent, or Firm*—Koppel, Patrick, Heybl & Dawson (57) ABSTRACT

Wireless communication systems and methods are provided that a) enable progressive beamforming with antenna arrays and subarrays, b) provide current and delayed versions of data-carrying signals, and c) provide time-of-arrival of data-carrying signals. The progressive beamforming substantially reduces computational complexity. The current and delayed versions of data-carrying signals facilitate optimization of spatial information and optimization of information from non-coherent delays (which are delays beyond the handling capability of a system's modulation). The time-of-arrival information is used to facilitate a single matrix inversion which substantially reduces the complexity of conventional beamforming computations.

50 Claims, 4 Drawing Sheets

ADAPTIVE BEAMFORMING METHODS AND SYSTEMS THAT ENHANCE PERFORMANCE AND REDUCE COMPUTATIONS

CROSS REFERENCES TO RELATED APPLICATIONS

This application claims the benefit of U.S. Provisional Application Ser. No. 60/446,947 filed Feb. 11, 2003.

BACKGROUND OF THE INVENTION

1. Field of the Invention

The present invention relates generally to wireless communication systems and, more particularly, to adaptive beamforming in such systems.

2. Description of the Related Art

A variety of wireless communication systems have utilized adaptive beamforming antenna methods that multiply signals received from a plurality of antenna elements (e.g., an antenna array) with complex weights and then sum the resulting products to generate an estimate of the transmitted signal. A cost function is typically based on the difference between this signal estimate and a desired signal wherein a portion of the desired signal (e.g. preamble, midamble or pilot tones) is known. An optimum set of complex weights is a set that minimizes the cost function.

Although this beamforming approach provides an optimal solution for signals received at a selected time-of-arrival, these may not be the signals of interest. For example, multipath signals (signals that travel over multiple different paths because of reflections from intervening objects) may arrive at spaced antennas at substantially-different times. Accordingly, this approach will process multipath signals that arrive at the selected time-of-arrival but spatially reject those that do not. The resultant estimate of the transmitted signal is then in error because it ignores relevant signal energy that arrived at times other than the selected time-of-arrival.

This approach also requires the substantial computational task of solving a series of equations that will optimize N complex weights which correspond to N antenna elements. In particular, this calculation includes the inversion of an N×N matrix and the multiplication of the inverted N×N matrix by an N×1 vector for each selected time-of-arrival.

Conventional adaptive beamforming approaches face additional problems when a system's multipath delays exceed the toleration capability of the signal's modulation format. Typically, time domain or frequency domain equalization has been used to resolve these multipath delays. In systems that incorporate adaptive beamforming antennas, however, it is difficult to integrate such equalizers with the beamforming algorithms.

Implementing the equalization prior to beamforming robs the equalization process of the beamforming gains, thereby causing inaccurate equalization. Adding the equalization after beamforming is problematic because the beamforming will treat signals with excess multipath delay as interference and therefore attempt to reject them. This reduces gains (e.g. diversity gain) that would normally enhance the desired signal via the beamforming process.

Attempts to solve these problems have generally required the initial calculation of the time-of-arrival for each multipath component that is to be constructively combined and subsequent reoptimization of the complex weights for each path. This, however, leads to substantially increased computational requirements because the required computations are multiplied by the number of paths to be processed.

Other conventional attempts have iteratively optimized the set of weights applied to each antenna element over a plurality of received symbols in order to thereby minimize the processing power required. Unfortunately, this generally increases the convergence time of the optimization so that the resulting processing gains are substantially less in the early portion of the received signal. This approach is thus particularly problematic for burst communication systems.

BRIEF SUMMARY OF THE INVENTION

The present invention is directed to beamforming concepts which include a) progressive beamforming that substantially reduces computational complexity, b) current and delayed versions of data-carrying signals that facilitate optimization of spatial information, and c) time-of-arrival information that facilitates a single matrix inversion which substantially reduces the complexity of conventional beamforming computations.

The novel features of the invention are set forth with particularity in the appended claims. The invention will be best understood from the following description when read in conjunction with the accompanying drawings.

DETAILED DESCRIPTION OF THE INVENTION

Figure 1:
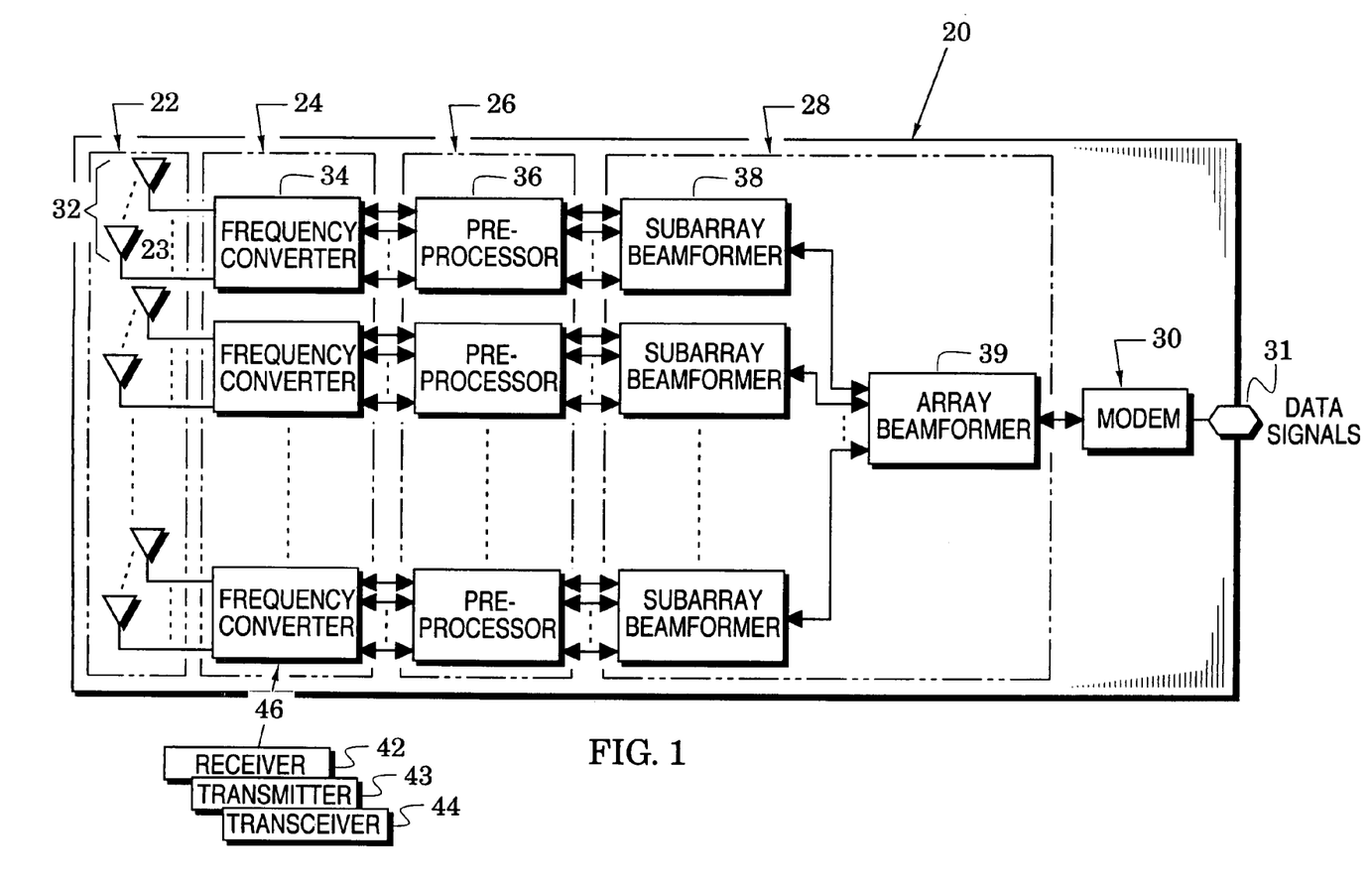
FIG. 1 is a block diagram of a wireless communication system of the present invention that facilitates a progressive beamforming method of the invention.

Attention is initially directed to FIG. 1 which illustrates a wireless communication system embodiment 20 that includes an array 22 of antennas 23, a radio-frequency (RF) frequency converter 24, a preprocessor 26, a beamformer 28 and a modulator/demodulator (modem) 30. The RF converter is coupled to the antenna array 22 and the preprocessor 26 couples the RF converter to the beamformer 28. The modem 30 is coupled between the beamformer and a system data port 31.

In at least one embodiment of the invention, the antenna array 22 is partitioned into subarrays 32, the RF converter 24 is partitioned into frequency converters 34, the preprocessor 26 is partitioned into preprocessors 36 and the beamformer 28 is partitioned into subarray beamformers 38 and an array beamformer 39. With reference to these element partitions, each frequency converter 34 is coupled to a respective subarray 32 of antennas 23 and each of the preprocessors 36 is coupled between a respective frequency converter and a respective subarray beamformer 38. Finally, the array beamformer 39 couples the subarray beamformers 38 to the modem 30.

The present invention recognizes that the computational complexity for beamforming is roughly proportional to the cube of the number of antenna elements (e.g., the computational complexity of inverting a corresponding matrix increases proportionally to the cube of the number of elements in either dimension of the matrix).

Accordingly, the invention provides the wireless communication system 20 to facilitate progressive beamforming in which optimum beams are generated to correspond to the subarrays 32 and subsequently aggregated in a second optimization process that corresponds to the array 22. The system 20 allows beamforming to be progressively completed in stages and is suitable for all modulation formats. Progressive beamforming of the system 20 substantially reduces computational complexity because it partitions the task into subtasks that each involve fewer elements. These concepts are further detailed in the following descriptions of receive and transmit operations of the wireless communication system 20.

In a receive operation, each of the frequency converters 34 converts the frequency of data-carrying signals that correspond to its respective subarray 22 (of antennas 21). The data-carrying signals are generally at a radio frequency in the subarrays 22 and at baseband or an intermediate frequency (IF) in the preprocessors 36, subarray beamformers 38 and the array beamformer 39.

Each subarray beamformer 38 receives the data-carrying signals of its respective subarray 32 and generates subarray signals that correspond to a subarray beam using a defined set of beamforming rules. Subsequently, the array beamformer receives these subarray signals and provides array signals that correspond to an array beam using a defined set of beamforming rules which need not be constrained to be the same rules used by the subarray beamformers.

Thus, each subarray beamformer 38 is configured to process respective data-carrying signals to correspond to a receive subarray antenna beam of its respective subarray and the array beamformer 39 is configured to process respective data-carrying signals to correspond to a receive array antenna beam of the array 22.

An exemplary beamforming rule multiplies signals derived from each antenna element by respective complex weights and adds the resulting products across the elements to form a sum signal. In general, the weights are optimized by maximizing or minimizing a signal parameter or error function. In an exemplary embodiment, the difference between the sum and a known, predetermined signal is minimized.

The preprocessors 36 are preferably inserted between the frequency converters 34 and the subarray beamformers 38 to digitize the data-carrying signals received from its respective frequency converter and to preprocess them to facilitate digital beamforming. Accordingly, the preprocessing are preferably configured to perform conventional processes which include automatic gain control (AGC), frequency correction, framing/time-of-arrival estimation, sampling rate and time adjustment, channel correction, frequency domain transformation, downconversion, filtering, subsampling, direct sequence de-spreading and similar processes that are typically used to correctly capture the downconverted information in digital format.

The system 20 preferably includes the modem 30 which demodulates the processed data-carrying signals from the array beamformer 39 to provide data at the system port 31. The modem may also provide an error correction function.

In a transmit operation of the system 20, data entering the system port 31 is modulated by the modem 30 and the modulated data is passed to the array beamformer 39 which operates with a defined set of beamforming rules to generate array signals which correspond to an array beam but comprise subarray signals that each correspond to a suboptimized beam of the array 22. Subsequently, the subarray beamformers 38 operate on the array signals from the array beamformer with a defined set of beamforming rules to generate subarray signals which correspond to subarray beams of respective subarrays 32.

Thus, each subarray beamformer 38 is configured to process respective data-carrying signals to correspond to a transmit subarray antenna beam of its respective subarray and the array beamformer 39 is configured to process respective data-carrying signals to correspond to a transmit array antenna beam of the array 22.

The transmit beamforming rules need not be constrained to be identical to those used in the receive operation described above. The array and subarray beamformers typically use a predetermined set of complex weights, e.g., stored weights or weights derived from the receive operation described above.

The preprocessors 36 are preferably inserted between the frequency converters 34 and the subarray beamformers 38 to transform the data-carrying signals wherein the transformation processes may include frequency translation, time domain transformation, upconversion, interpolation, frequency correction, direct sequence spreading, analog conversion, filtering or other similar processes suitable for transmitting the data-carrying signals. The transformed signals are converted to RF signals in each of the frequency converters 34 and radiated from that converter's respective subarray 32.

The progressive beamforming of the invention substantially reduces the computational complexity of the communication system 20. If there were four subarrays 32 in the communication system, for example, the processing complexity required to invert matrices in the four subarray beamformers and the array beamformer would each correspond to the number $4^3$ or 64. The processing complexity for all five beamformers would thus correspond to the number 5×64=324.

In contrast, the processing complexity required to invert matrices in a conventional beamformer for all 16 antennas 23 would correspond to the number $16^3$ or 4096 which is more than 12 times the complexity of the communication system of the invention. It is noted that the beamforming methods of the invention are especially suited to communication environments that are not excessively plagued with interference which would degrade the method results.

In different system embodiments, the frequency converters 34 can each be realized with a receiver 42, a transmitter 43 or a transceiver 44 as exemplified by an insertion arrow 46 in FIG. 1.

Figure 2A:
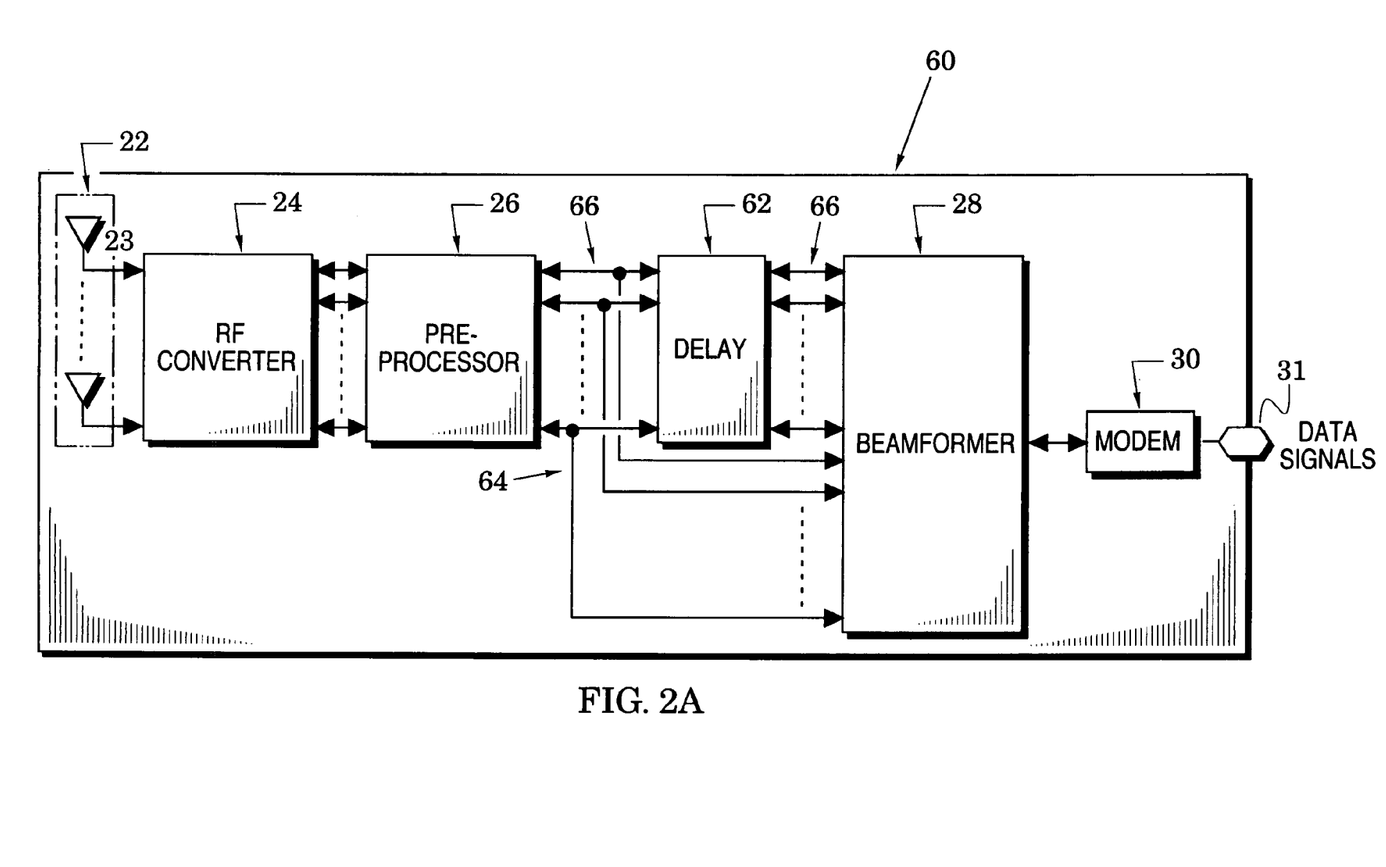
FIGS. 2A and 2B are block diagrams of wireless communication systems system that enhance beamforming performance with multipath signals.
Figure 2B:
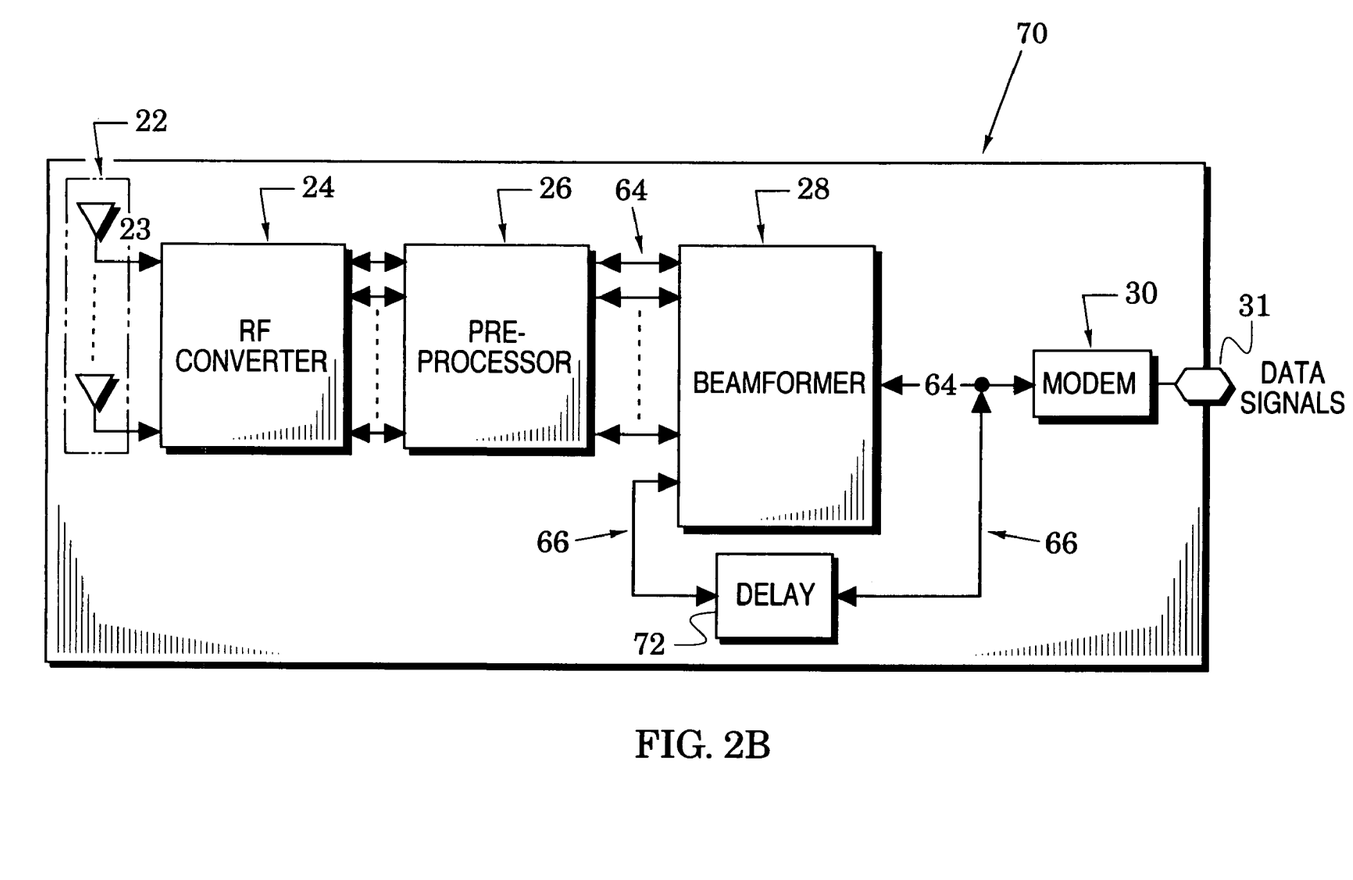

Attention is now directed to the wireless communication systems 60 and 70 of FIGS. 2A and 2B which are similar to the system 20 of FIG. 1 with like elements indicated by like reference numbers. In the systems 60 and 70, the frequency converter 24, preprocessor 26 and beamformer 28 perform operational functions similar to those described above for the partitioned frequency converters 34, preprocessors 36 and subarray and array beamformers 38 and 39 of FIG. 1.

The beamformer 28 of FIGS. 2A and 2B is coupled to exchange current data-carrying signals with the preprocessor 26 and the modem 30. In addition, the systems 60 and 70 include delays 62 and 72 positioned to provide at least one delay path for routing of the current data-carrying signals to thereby also provide delayed data-carrying signals to the beamformer. In particular, the data-carrying signals include symbols that have a symbol time duration and the delays 62 and 72 provide time delays that are selectable between a portion of a symbol time duration and a plurality of symbol time durations. The beamformer is thus enabled to process current and delayed data-carrying signals 64 and 66 to correspond to an antenna beam of the array 22.

The delay 62 is inserted between the preprocessor 26 and the beamformer 28 in FIG. 2A. Current data-carrying signals 64 can thus be exchanged between the preprocessor and the beamformer but these signals also pass through the delay 62 which provides delay paths so that delayed data-carrying signals 66 are also exchanged between the preprocessor and the beamformer. The delay 72 is coupled around the beamformer 28 in FIG. 2B. Current data-carrying signals 64 can thus be exchanged between the preprocessor and the beamformer and between the modem and the beamformer but the beamformer has access to delayed data-carrying signals 66 that have already passed through the beamforming process.

The present invention recognizes that excessive multipath delay can generate inter-symbol interference between two adjacent symbols (e.g. in an orthogonal frequency division multiplexing (OFDM) system where multipath delay is longer than a guard interval). Accordingly, the wireless communication systems 60 and 70 are structured to provide current and delayed versions of data-carrying signals so that the systems can optimize spatial information and also optimize information from non-coherent delays which are delays beyond the handling capability of the system modulation.

In particular, the data-carrying signals include symbols that have a symbol time duration and the delays 62 and 72 provide time delays that are selectable between a portion of a symbol time duration and a plurality of symbol time durations. Although these time delays are envisioned to typically be one symbol in systems that use an OFDM or CDMA modulation format, they can, in general modulation formats, be as long as a plurality of symbols. Information from each symbol delay is thus provided to thereby enhance the beamforming functions of the invention.

Figure 3:
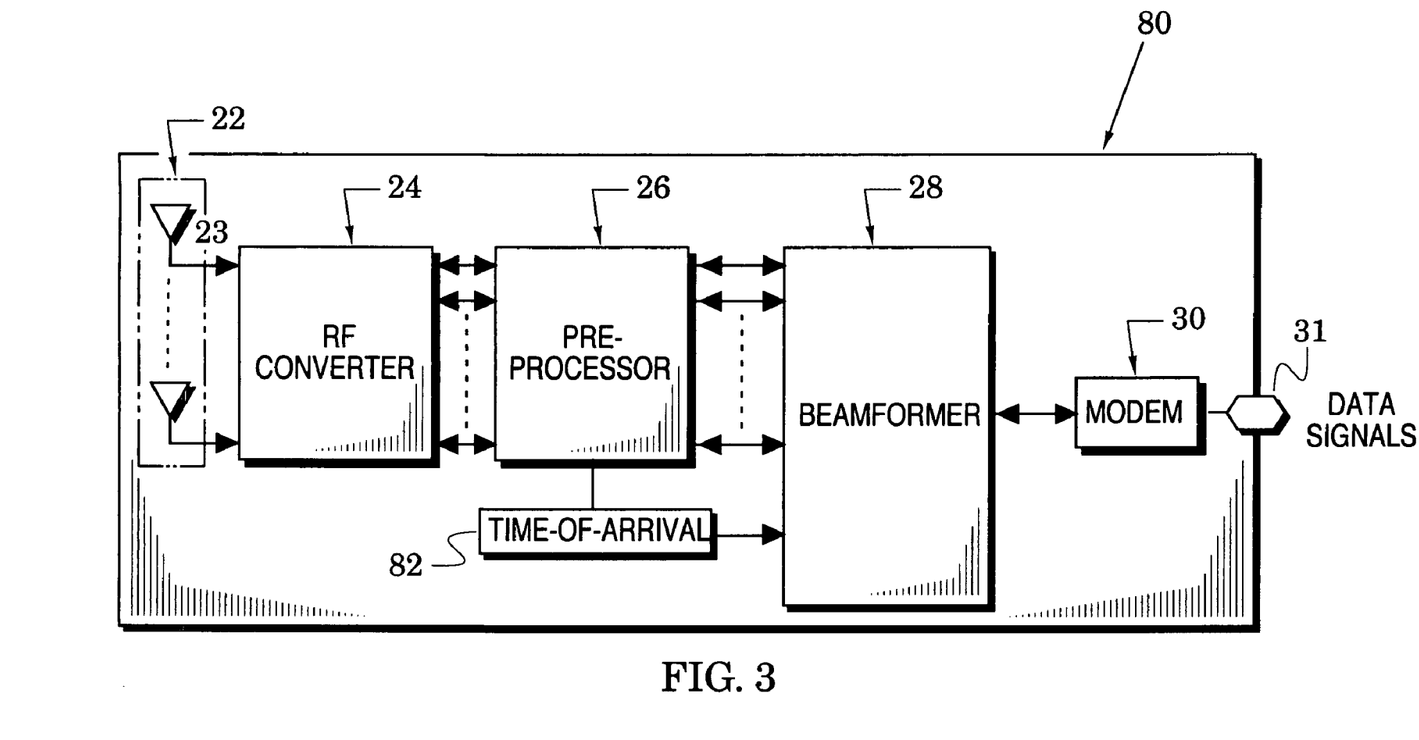
FIG. 3 is a block diagram of a wireless communication system that reduces beamforming computations.

Attention is now directed to the wireless communication system 80 of FIG. 3 which is similar to the system 20 of FIG. 1 with like elements indicated by like reference numbers. In the system 80, the frequency converter 24, preprocessor 26 and beamformer 28 perform operational functions similar to those described above for the partitioned frequency converters 34, preprocessors 36 and subarray and array beamformers 38 and 39 of FIG. 1.

In a receive operation of the system 80, data-carrying signals are received through the array 22, their frequency is altered in the signal converter 24 and they are transformed by the preprocessor 26 into transformed data-carrying signals.

For systems that utilize OFDM modulation formats, it is recognized that the OFDM waveform contains a guard interval that is inserted to eliminate inter-symbol interference caused by multipath signals, provided that the multipath delay is less than the size of the guard interval. For adaptive beamforming on OFDM waveforms, the present invention uses this guard interval and the inherent cyclic nature of each OFDM symbol to minimize the computational requirements in processing all potentially useful multipath energy (i.e., all signals whose multipath delay is less than the guard interval).

In addition to transforming functions described above with reference to the system 20 of FIG. 1, the preprocessor 26 of FIG. 3 is therefore configured to estimate the time-of-arrival or framing for the received data-carrying signals. As shown in FIG. 3, the time-of-arrivals 82 are provided to the beamformer 28 which is configured to process the transformed data-carrying signals to correspond to a desired antenna beam of the array 22.

In particular, the beamformer 28 may modify the transformed data-carrying signals with complex weights and sum the products to form a weighted, summed signal which is compared to a desired, predetermined signal. A cost function represents the error between the weighted, summed signal and the predetermined signal and the beamformer 28 is configured to minimize this cost function with appropriately-determined weights.

For example, the cost function can be minimized by calculating an N×N covariance matrix C in which each element $C_{ij}$ is calculated as the covariance of transformed signals i and j over a specified frame time (typically a frame time during the preamble of the data-carrying signals). Typically, an N×1 vector D is also generated in which each element $D_i$ is calculated as the correlation of a transformed signal i and the desired signal with a desired framing reference based on the estimate time-of-arrival. An optimal set of complex weights is then computed by multiplying the inverse of matrix C by the vector D to realize an N×1 vector K in which $K_i$ is the optimized weight to multiply transformed signal i.

The invention notes that this approach produces an antenna beam that is optimized for signals arriving at the array 22 coincident with the estimated time-of-arrival used above to derive framing for the covariance functions. Accordingly, transformed signals with substantially different times-of-arrival will be rejected and their signal energy is unavailable to the resulting beam.

Although these signals can be included by recalculating a different beam for each possible estimated time-of-arrival, this substantially increases the computational effort (e.g., increases it by a factor equal to the number of estimated times-of-arrival considered). Processing each estimated time-of-arrival independently is also sub-optimal because signals associated with different times-of-arrival are treated as interference (in calculation of the covariance matrix) and a portion of the beamforming benefit is therefore used in rejecting multipath energy that is associated with times-of-arrival that differ from the one being calculated.

As previously noted, OFDM systems include a guard interval which causes the OFDM frame of interest to be inherently cyclical. The invention recognizes that, with accurate framing of the OFDM frame, multipath energy which is within the guard interval will manifest itself as coherent energy in the calculation of the covariance matrix C. Therefore, all multipath delays that are within the guard interval time can be accommodated with a single covariance matrix calculation.

The calculation of multiple beams that are each associated with substantially different times-of-arrival of a multipath signal can therefore be accommodated (as long as the times of arrival are all within the guard interval) with a single matrix inversion by expanding the covariance vector D into an N×N matrix. This matrix is composed of N vectors (each N×1 in dimension) wherein $D_{ij}$ is the covariance between a transformed version of the desired signal and the transformed data-carrying signals.

The transform to be applied to the desired signal is a phase shift across the tones of the desired OFDM waveform wherein the phase shift is based on the delays to be accommodated. The resulting set of weights is an N×N matrix W. Multiplying the 1×N input vector by the weight matrix W provides a 1×N vector that comprises the output of each beam optimized for a different time-of-arrival. Optionally, these beams can be equalized in the frequency domain (to make them phase coherent with each other). The resulting beams are then added to form a single beam. Alternatively, these beams may be maximally combined to minimize error or maximize a performance parameter.

Because the majority of computational requirements in conventional beamforming involves repeated inversions of the covariance matrix C for each delayed data-carrying signal, the calculation of a single inverted matrix represents a dramatic reduction in computational requirements. There is a performance degradation associated with rejecting non-coherent multipath signals which are less than the guard interval and this degradation is minimized because a single covariance matrix is used to derive all beams.

Finally, equalization is improved because frequency domain equalization is performed on beamformed signals with spatial processing gain and this enhances the performance of the equalization. This contrasts to conventional beamforming methods that perform equalization on a channel-by-channel basis which robs this process of the beamforming gain with the result that beamforming accuracy is degraded.

Although various structures of the invention (e.g., preprocessor 26, and beamformer 28 of FIG. 1) are especially suited for realization with digital circuitry, they may also be realized with analog circuitry or combinations of digital and analog circuitry. The preprocessors, beamformers and delays (62 and 72 in FIGS. 2A and 2B) can be realized, for example, with a) arrays of logic gates, b) an appropriately-programmed digital processor, or c) combinations of a) and b). The delays 62 and 72 of FIGS. 2A and 2B, for example, can be realized with various analog and digital delay circuits or processors.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A communication system that processes data-carrying signals, the system comprising:
   an array of antennas that is partitioned into subarrays;
   a plurality of subarray beamformers;
   a plurality of frequency converters that each couple a respective one of said subarray beamformers to a respective one of said subarrays and each alter the frequency of data-carrying signals associated with its respective subarray; and
   an array beamformer coupled to said subarray beamformers;
   wherein,
   each of said subarray beamformers is configured to process respective data-carrying signals to correspond to a subarray antenna beam of its respective subarray; and
   said array beamformer is configured to process respective data-carrying signals to correspond to an array antenna beam of said array;
   said data-carrying signals thereby processed progressively to reduce computational complexity of said system;
   and further including a delay associated with each of said subarray beamformers and positioned to provide at least one delay path for routing of respective data-carrying signals to thereby provide delayed data-carrying signals;
   wherein each subarray beamformer is configured to process said data-carrying signals and said delayed data-carrying signals to correspond to a respective antenna beam of said subarray;
   and wherein said data-carrying signals include symbols that have a symbol time duration and said delay provides a time delay that is selectable between a portion of a symbol time duration and a plurality of symbol time durations.

2. The system of claim 1, wherein each of said subarray beamformers and said array beamformer are further configured to modify respective data-carrying signals with complex weights to thereby approximate a predetermined data-carrying signal.

3. The system of claim 1, further including a modem coupled to said array beamformer to demodulate data from data-carrying signals of said array beamformer and to modulate data onto data-carrying signals of said array beamformer.

4. The system of claim 1, further including a plurality of preprocessors that are each inserted between a respective one of said frequency converters and a respective one of said subarray beamformers to process said data-carrying signals with at least one of the processes of gain control, frequency correction, framing and time-of-arrival estimation, establishment of a sampling rate, time adjustment, channel correction, frequency domain transformation, downconversion, filtering, subsampling, and direct sequence de-spreading.

5. The system of claim 1, further including a plurality of preprocessors that are each inserted between a respective one of said frequency converters and a respective one of said subarray beamformers to process said data-carrying signals with at least one of the processes of frequency translation, time domain transformation, upconversion, interpolation, frequency correction, direct sequence spreading, analog conversion, and filtering.

6. The system of claim 1, wherein said subarray beamformers and said array beamformer are realized with at least one of an array of logic gates and an appropriately-programmed digital processor.

7. The system of claim 1, wherein each of said frequency converters comprises a receiver.

8. The system of claim 1, wherein each of said frequency converters comprises a transmitter.

9. The system of claim 1, wherein each of said frequency converters comprises a transceiver.

10. A communication system that processes data-carrying signals, the system comprising:
    an array of antennas;
    a preprocessor;
    a frequency converter coupled between said array and said preprocessor to alter the frequency of data-camming signals associated with said array;
    a modem;
    a beamformer coupled to exchange current data-carrying signals with said preprocessor and said modem; and
    a delay positioned to provide at least one delay path for routing of said current data-carrying signals to thereby provide delayed data-camming signals to said beamformer;
    wherein said beamformer is configured to process said current data-carrying signals and said delayed data-camming signals to correspond to an antenna beam of said array;
    and wherein said data-carrying signals include symbols that have a symbol time duration and said delay provides a time delay that is selectable between a portion of a symbol time duration and a plurality of symbol time durations.

11. The system of claim 10, wherein said beamformer is configured to process said delayed data-carrying signals to regain information contained in non-coherent delays of said current data-carrying signals.

12. The system of claim 10, wherein said delay is coupled between said preprocessor and said beamformer to establish said delay path.

13. The system of claim 10, wherein said delay is coupled about said beamformer to establish said delay path.

14. The system of claim 10, wherein said delay provides a selectable time delay.

15. The system of claim 10, wherein said beamformer is further configured to modify respective data-carrying signals with complex weights to thereby approximate a predetermined data-carrying signal.

16. The system of claim 10, wherein said modem is configured to demodulate data from data-carrying signals of said beamformer and to modulate data onto data-carrying signals of said beamformer.

17. The system of claim 10, wherein said preprocessor is configured to process said data-carrying signals with at least one of the processes of gain control, frequency correction, framing and time-of-arrival estimation, establishment of a sampling rate, time adjustment, channel correction, frequency domain transformation, downconversion, filtering, subsampling, and direct sequence de-spreading.

18. The system of claim 10, wherein said preprocessor is configured to process said data-carrying signals with at least one of the processes of frequency translation, time domain transformation, upconversion, interpolation, frequency correction, direct sequence spreading, analog conversion, and filtering.

19. The system of claim 10, wherein said beamformer is realized with at least one of an array of logic gates and an appropriately-programmed digital processor.

20. The system of claim 10, wherein said frequency converter comprises a receiver.

21. The system of claim 10, wherein said frequency converter comprises a transmitter.

22. The system of claim 10, wherein said frequency converter comprises a transceiver.

23. A communication system that processes data-carrying signals, the system comprising:
an array of antennas;
a preprocessor;
a frequency converter coupled between said array and said preprocessor to alter the frequency of data-carrying signals associated with said array; and
a beamformer coupled to said preprocessor;
wherein;
said preprocessor receives said data-carrying signals and provides corresponding time-of-arrival signals to said beamformer; and
in response to said time-of-arrival signals, said beamformer is configured to;
a) form a covariance matrix from a first set of data-carrying signals whose times-of-arrival at said array are within a predetermined time window;
b) invert said covariance matrix to obtain an inverted covariance matrix;
c) form a correlation matrix from said first set and a second set of predetermined signals;
d) multiply said inverted covariance matrix and said correlation matrix to thereby determine a plurality of weights; and
e) process said first set with said weights to obtain processed signals that correspond to a plurality of antenna beams of said array.

24. The system of claim 23, wherein said beamformer is further configured to maximally combine said processed signals to optimize a performance parameter.

25. The system of claim 23, wherein said data-carrying signals are modulated in accordance with orthogonal frequency division multiplexing and said predetermined time window is a guard interval.

26. The system of claim 23, wherein said data-carrying signals contain tones and said beamformer is further configured to apply phase shifts that conform tones of said second set to said predetermined time window.

27. The system of claim 23, further including a modem coupled to said beamformer to demodulate data from said data-carrying signals.

28. The system of claim 23, wherein said frequency converter comprises a receiver.

29. A method of processing data-carrying signals in a communication system, comprising the steps of:
converting the frequency of data-carrying signals that are associated with each subarray of an array of antennas;
for each subarray, processing respective data-carrying signals to correspond to a subarray antenna beam of that subarray; and
for said array, processing respective data-carrying signals to correspond to an array antenna beam of said array;
processing of said data-carrying signals thereby realized progressively to reduce computational complexity of said system;
wherein said subarray processing step includes the steps of:
converting the frequency of current data-camming signals that are associated with that subarray;
routing at least part of said current data-carrying signals through at least one delay path to provide delayed data-camming signals;
and
processing said current data-carrying signals and said delayed data-carrying signals to correspond to an antenna beam of said array wherein this processing step includes the step of processing said delayed data-camming signals to regain information contained in non-coherent delays of said current data-carrying signals.

30. The method of claim 29, wherein said processing steps each include the step of modifying respective data-carrying signals with complex weights to thereby approximate a predetermined data-carrying signal.

31. The method of claim 29, further including the steps of:
demodulating data from data-carrying signals of said array beamformer; and
modulating data onto data-carrying signals of said array beamformer.

32. The method of claim 29, further including the step of processing said data-carrying signals with at least one of the processes of gain control, frequency correction, framing and time-of-arrival estimation, establishment of a sampling rate, time adjustment, channel correction, frequency domain transformation, downconversion, filtering, subsampling, and direct sequence de-spreading.

33. The method of claim 29, further including the step of processing said data-carrying signals with at least one of the processes of frequency translation, time domain transformation, upconversion, interpolation, frequency correction, direct sequence spreading, analog conversion, and filtering.

34. The method of claim 29, wherein said converting step includes the step of receiving said data-carrying signals.

35. The method of claim 29, wherein said converting step includes the step of transmitting said data-carrying signals.

36. A method of processing data-carrying signals in a communication system, comprising the steps of:
converting the frequency of current data-carrying signals that are associated with an array of antennas;
routing at least part of said current data-carrying signals through at least one delay path to provide delayed data-carrying signals; and
processing said current data-carrying signals and said delayed data-carrying signals to correspond to an antenna beam of said array;
wherein said processing step includes the step of processing said delayed data-carrying signals to regain information contained in non-coherent delays of said current data-carrying signals.

37. The method of claim 36, wherein said current data-carrying signals include symbols that have a symbol time duration and said routing step includes the step of configuring said delay path to provide time delays that are selectable between a portion of a symbol time duration and a plurality of symbol time durations.

38. The method of claim 36, wherein said processing steps each include the step of modifying respective data-carrying signals with complex weights to thereby approximate a predetermined data-carrying signal.

39. The method of claim 36, further including the steps of:
demodulating data from data-carrying signals of said array beamformer; and
modulating data onto data-carrying signals of said array beamformer.

40. The method of claim 36, further including the step of processing said data-carrying signals with at least one of the processes of gain control, frequency correction, framing and time-of-arrival estimation, establishment of a sampling rate, time adjustment, channel correction, frequency domain transformation, downconversion, filtering, subsampling, and direct sequence de-spreading.

41. The method of claim 36, further including the step of processing said data-carrying signals with at least one of the processes of frequency translation, time domain transformation, upconversion, interpolation, frequency correction, direct sequence spreading, analog conversion, and filtering.

42. The method of claim 36, wherein said converting step includes the step of receiving said data-carrying signals.

43. The method of claim 36, wherein said converting step includes the step of transmitting said data-carrying signals.

44. A method of processing data-carrying signals in a communication system, comprising the steps of:
forming a covariance matrix from a first set of data-carrying signals whose times-of-arrival at an array of antennas are within a predetermined time window;
inverting said covariance matrix to obtain an inverted covariance matrix;
forming a correlation matrix from said first set and a second set of predetermined signals;
multiplying said inverted covariance matrix and said correlation matrix to thereby determine a plurality of weights; and
processing said first set with said weights to obtain processed signals that correspond to a plurality of antenna beams of said array.

45. The method of claim 44, wherein said processing step further includes the step of maximally combining said processed signals to optimize a performance parameter.

46. The method of claim 44, wherein said processing step further includes the step of applying phase shifts to equalize said first set.

47. The method of claim 44, wherein said data-carrying signals are modulated in accordance with orthogonal frequency division multiplexing and said predetermined time window is a guard interval.

48. The method of claim 44, wherein said data-carrying signals contain tones and further including the step of applying phase shifts that conform tones of said second set to said predetermined time window.

49. The method of claim 44, further including the step of demodulating data from said data-carrying signals.

50. The method of claim 49, further including the step of processing said data-carrying signals with at least one of the processes of gain control, frequency correction, framing and time-of-arrival estimation, establishment of a sampling rate, time adjustment, channel correction, frequency domain transformation, downconversion, filtering, subsampling, and direct sequence de-spreading.

* * * * *

UNITED STATES PATENT AND TRADEMARK OFFICE
CERTIFICATE OF CORRECTION

PATENT NO.         : 7,339,979 B1
APPLICATION NO. : 10/764040
DATED              : March 4, 2008
INVENTOR(S)       : Kris Kelkar Page 1 of 1

It is certified that error appears in the above-identified patent and that said Letters Patent is hereby corrected as shown below:

Claim 10, line 13, delete "data-camming" and insert --data-carrying--

Claim 10, line 17, delete "camming" and insert --carrying--

Claim 29, line 15, delete "data-camming" and insert --data-carrying--

Claim 29, line 19, delete "data-camming" and insert --data-carrying--

Claim 29, line 25, delete "camming" and insert --carrying--

Signed and Sealed this

Tenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,339,979 B1  
APPLICATION NO. : 10/764040  
DATED : March 4, 2008  
INVENTOR(S) : Kris Kelkar Page 1 of 1

It is certified that error appears in the above-identified patent and that said Letters Patent is hereby corrected as shown below:

Column 8, Claim 10, line 57, delete "data-camming" and insert --data-carrying--

Column 8, Claim 10, line 61, delete "camming" and insert --carrying--

Column 10, Claim 29, line 34, delete "data-camming" and insert --data-carrying--

Column 10, Claim 29, line 38, delete "data-camming" and insert --data-carrying--

Column 10, Claim 29, line 44, delete "camming" and insert --carrying--

This certificate supersedes the Certificate of Correction issued February 10, 2009.

Signed and Sealed this

Tenth Day of March, 2009

JOHN DOLL  
*Acting Director of the United States Patent and Trademark Office*